Dec. 16, 1924.
W. J. A. LONDON
FLOW METER
Filed Nov. 23, 1923
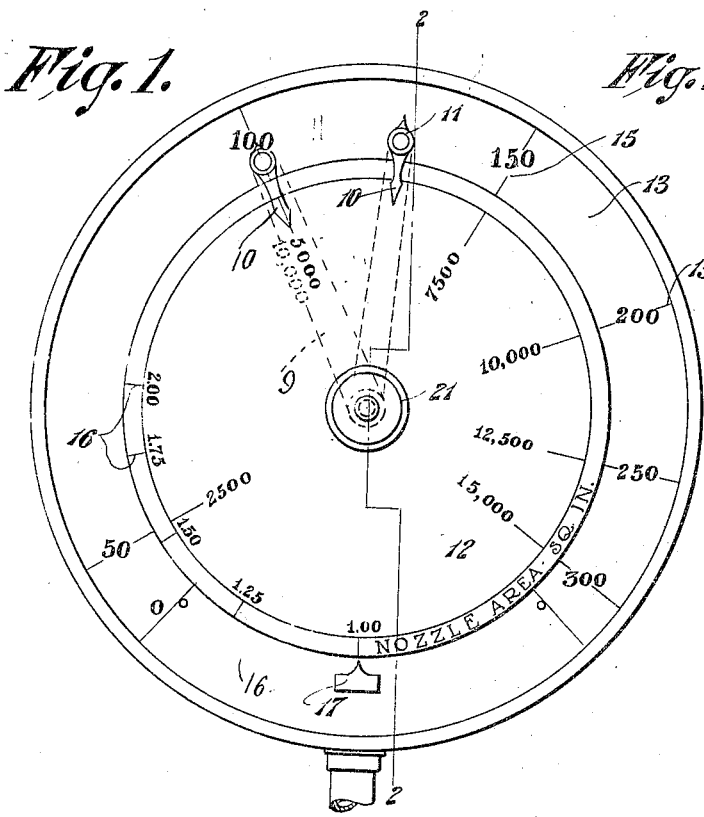
INVENTOR,
William J. A. London,
BY
Harry W. Bowen.
ATTORNEY.

Patented Dec. 16, 1924.

1,519,855

UNITED STATES PATENT OFFICE.

WILLIAM J. A. LONDON, OF SPRINGFIELD, MASSACHUSETTS.

FLOW METER.

Application filed November 23, 1923. Serial No. 676,655.

*To all whom it may concern:*

Be it known that I, WILLIAM J. A. LONDON, a subject of the King of Great Britain, residing at Springfield, in the county of Hampden and State of Massachusetts, have invented certain new and useful Improvements in Flow Meters, of which the following is a specification.

This invention relates to improvements in flow meters.

It is designed for use as for example with steam turbines or other apparatus where steam or other gaseous fluids is expanded through nozzles and where the terminal pressure at the end of the nozzles is less than approximately .58 of the initial pressure.

An object of the invention is to combine with the ordinary steam pressure gage, a movable member having numerals or figures thereon which indicate the area of the nozzle through which the steam flows, and, a compensating mechanism between the pointer of the gage and the usual Bourdon tube, whereby the movements of the pointer, instead of being uniform throughout its travel will correspond with the various adjusted positions of the movable dial on which the nozzle areas are placed. The well-known Napier's formula for the flow of steam through nozzles furnishes a very accurate method of computing the flow of steam. The formula is as follows:

$$W = \frac{PA}{70}$$

where W=weight of steam in discharge in pounds per second, P=absolute pressure in pounds per square inches. A=nozzle area at the throat in square inches.

This formula has been carefully checked up by many thousands of experiments and in general steam turbine practice it is accepted as being theoretically correct except that in practice it is found that the constant "70" should be changed to 72 as giving a closer approximation of the steam flow in pounds per second than Napier's original constant 70.

The flow of steam per second would be too small a time to measure the weight, therefore, the formula should be changed to read or measure the flow of steam per hour, and using the constant 72 instead of 70, the present formula of flow of steam per hour in pounds is $$W = \frac{PA \times 3600}{72}$$

which simplified=W=50PA.

Looking at this formula we see that a steam pressure gage may be used to measure the flow of steam when placed at the inlet of the nozzle if the pressure registered is multiplied by the area of the jet and divided by the constant. An ordinary steam gage may therefore be used as a steam flow meter. The only change in the ordinary steam gage would therefore be the attaching of a dial which would read directly the flow of steam in pounds passing through nozzles of different sizes, and which may be adjusted to suit nozzles of different areas. To obtain results for different pressures a compensating mechanism between the pointer of the pressure gage and the Bourdon tube would be necessary whereby the pressure and weight of flow of steam is not recorded in equal increments but is recorded on a logarithmic scale.

Referring to the drawings:

Fig. 1 is a front elevational view of the instrument showing figures indicating steam pressure, a movable dial with figures thereon indicating pounds of steam per hour, and other figures on this dial representing the nozzle area in square inches and a pointer member which is actuated by the ordinary Bourdon tube.

Fig. 2 is a vertical sectional view on the line 2—2 of Fig. 1, showing the compensating gears between the Bourdon tube and the pointer, also a movable dial, the pointer having one portion which swings over the movable dial and the other portion which moves over the fixed dial for indicating steam pressures.

Fig. 3 is a vertical sectional view on the line 3—3 of Fig. 2 showing the compensating gears between the tube and the pointer.

Referring to the drawings in detail:

1 designates the usual steam gage casing having a pipe 2 for attaching the gage to a steam pipe. 3 is the usual Bourdon tube one end of which is in communication with the pipe 2 and its free end 4 being connected to the gear 5 by means of the link 6. This gear is pivoted to the casing at the point 7. 8 designates a gear meshing with the gear 5 the teeth of these gears are laid out on what is known as the logarithmic spiral for the purpose of imparting a compensating movement to the pointer 9. This pointer is formed with a downwardly extending portion 10 and an upwardly extending end 11. The end 10 swings over the movable dial 12 and the end 11 swings over the dial 13 which is secured to the casing by means of the bracket 14 or other suitable way. On the dial 13 is placed the numerals, 50, 100, 150, 200, etc., representing pressures in pounds per square inch. It will be noticed that the spacing of these numerals on the lines 15 is not equal but are laid out in accordance with the logarithmic scale. On the dial 12 are placed the numbers 2500, 5000, 7500, 10,000, etc., which indicates the weight in pounds of steam per hour flowing through nozzles of different areas also arranged on this movable dial 12 are the numerals 1, 1.25, 1.50, 2.00 opposite the spacing lines 16. These numerals indicate the area of the steam nozzle in square inches. 17 is a fixed pointer which is secured to the casing 1 and is located adjacent the division lines 16 adjacent which are placed the numerals designating the nozzle areas. The dial 12 is mounted for rotative movement in the glass front 18 by means of the shaft 19 which turns in an opening of the glass front and to which the dial 12 is secured as indicated by the pin 20. The instrument is used as follows:

The operator turns the dial 12 by means of the knob 21 so that the pointer 17 corresponds with the correct nozzle area as indicated by the numerals 1.00, 1.25, 1.50, etc., which is the correct nozzle area through which the steam or other gaseous fluid is flowing. As for example, if the steam pressure is 100 lbs. absolute, and the nozzle area is 1 square inch, the flow of steam per hour would be indicated by the pointer as 5,000 lbs. which numeral as shown in Fig. 1 is opposite the numeral 100 that represents steam pressure. If the nozzle area is 2 square inches and the dial 12 is turned so that the pointer 17 is opposite 2 square inches and the pressure is still 100 the flow of steam in pounds per hour would then be 10,000 as indicated in dotted lines and in order to make the instrument read accurately the logarithmic or compensating gears 5 and 8 are employed to make the throw of the pointer 9 correspond with the logarithmic reading of the steam pressures and weights or flow of steam per hour as indicated on the dial 12.

It will therefore be seen from this description that an ordinary steam pressure gage may readily be used so as to directly indicate the flow of steam in pounds per hour correspond to steam nozzles of different areas and different boiler pressures. It being understood that the pressures computed are absolute pressures. It is also apparent that separate dials can be fitted where the variation is beyond the practical scope of one dial.

It is to be understood that the present invention is not intended to be limited to measuring the flow of steam in pounds per hour but is intended for general application wherever occasion arises for the use of such instruments, as the measurement of the flow of air or other gaseous fluids, in pounds per hour.

What I claim is:

1. In a fluid flow meter, the combination, of a dial to indicate pressures of the fluid, as steam, a movable dial for indicating the weight of the flow of the fluid per hour and having thereon a series of figures for indicating the nozzle area in square inches and other figures for indicating the weight of the fluid, a Bourdon tube, a pointer adapted to swing over both scales of the dials thereon, a compensating mechanism between the pointer and the Bourdon tube, whereby the pointer will simultaneously designate the fluid pressure and the flow of the fluid per hour corresponding to nozzles of different areas.

2. In a fluid flow meter, the combination of a fixed dial having numerals thereon for indicating the pressures of the fluid to be measured and spaced from each other in accordance with the logarithmic scale, a movable dial having numerals thereon for indicating the flow of the fluid per hour and spaced from each other in accordance with the spacing of the pressure indicating numerals, said movable dial having numerals thereon indicating the area of the nozzle in square inches, a pointer secured to the casing and designed to register with the movable dial having numerals thereon which designate nozzle areas, a pointer adapted to swing over the two dials and a compensating device for controlling the movements of the pointer in accordance with the spacing of the dials.

3. A combined pressure and fluid flow instrument comprising, in combination, an enclosing casing, a fluid receiving tube therein, a movable pointer, compensating devices between the pointer and tube and including gears formed as logarithmic spirals, two dials, one being fixed and the other movable having numerals thereon for indicating the fluid pressure and flow respectively.

4. A combination fluid pressure gage and flow meter comprising, in combination, a pointer, two dials, one dial being fixed and the other movable and over which the pointer moves, the movable dial having numerals thereon for indicating nozzle areas of different sizes and the flow of the fluid for each nozzle area, the casing having a pointer secured thereto for cooperating with said movable dial and area numerals for determining the position of the movable dial and compensating means for actuating the movable pointer in accordance with the spacing of the numerals on the fixed and movable dial to simultaneously indicate fluid pressures and the flow of the fluid in pounds per hour with reference to a particular nozzle area.

5. An instrument for the purpose described, including a movable pointer, a fixed and a movable dial having graduations thereon which are spaced from each other in accordance with the logarithmic scale, and numerals adjacent the spacing to indicate pressures and flow of a fluid as steam, or air, and means comprising gears formed as logarithmic spirals for actuating the pointer in accordance with the spacing.

WILLIAM J. A. LONDON.